(12) United States Patent
Aparbal

(10) Patent No.: US 8,209,820 B1
(45) Date of Patent: Jul. 3, 2012

(54) CORD-RETAINING FASTENER FOR BUNDLED CORDS

(76) Inventor: Jainarine Aparbal, Miami, FL (US)

( * ) Notice: Subject to any disclaimer, the term of this patent is extended or adjusted under 35 U.S.C. 154(b) by 342 days.

(21) Appl. No.: 12/486,032

(22) Filed: Jun. 17, 2009

Related U.S. Application Data

(60) Provisional application No. 61/073,185, filed on Jun. 17, 2008.

(51) Int. Cl.
B65D 63/10 (2006.01)
H01R 13/639 (2006.01)

(52) U.S. Cl. ........................................ 24/16 R; 439/369
(58) Field of Classification Search .................. None
See application file for complete search history.

(56) References Cited

U.S. PATENT DOCUMENTS

| | | | |
|---|---|---|---|
| 3,597,803 A | 8/1971 | Van Neil | |
| 4,780,935 A | 11/1988 | Palombit | |
| 4,815,172 A | 3/1989 | Ward | |
| 4,939,818 A | 7/1990 | Hahn | |
| 4,991,265 A | 2/1991 | Campbell et al. | |
| 5,075,934 A * | 12/1991 | Osedo | 24/16 R |
| 5,560,564 A | 10/1996 | Maynard | |
| 5,581,850 A | 12/1996 | Acker | |
| 5,881,436 A * | 3/1999 | Lyons | 24/16 R |
| 6,523,229 B2 | 2/2003 | Severson | |
| 7,124,975 B2 | 10/2006 | Richardson | |

* cited by examiner

Primary Examiner — Jack W. Lavinder
(74) Attorney, Agent, or Firm — H. John Rizvi; Glenn E. Gold; Gold & Rizvi, P.A.

(57) ABSTRACT

A cord-retaining fastener for holding bundled cords, wires, hoses, cords, ropes, cables, or other elongated articles is provided and includes a flexible elongated webbed strap of sufficient length to extend around the bundled cord, a narrow elongated rectangular sleeve, and a buckle or other strap-end-retaining device.

The rectangular sleeve captively receives two portions of an intermediary segment of the elongated webbed strap to form a fastener-attaching loop, which is positioned around an end of the cord to releasably affix the fastener to the cord.

The buckle is secured near a first end of the webbed strap to frictionally engage a second end of the webbed strap, forming a cord-binding loop to encircle and releasably hold the bundled cord.

Thus the cord-retaining fastener conveniently remains attached near the end of the cord via the fastener-attaching loop, ready to buckle around the coils of the cord when it is bundled.

12 Claims, 6 Drawing Sheets

CORD-RETAINING FASTENER FOR BUNDLED CORDS

CROSS-REFERENCE TO RELATED APPLICATION

This Non-Provisional Application claims the benefit of U.S. Provisional Patent Application Ser. No. 61/073,185, filed on Jun. 17, 2008, which is incorporated herein in its entirety.

BACKGROUND OF THE INVENTION

1. Field of the Invention

The present invention relates generally to fasteners, and more particularly, but not by way of limitation, to a cord-retaining fastener configured to be attached to the end of a cord so as to remain easily accessible for releasably securing the coils of the cord when bundled.

2. Description of the Prior Art

Controlling lengths of various types of elongated articles, such as cords, electrical wires, hoses, ropes, cables, or other long, slender items, is important for convenience in transportation, for compact storage, and to prevent tangling and damage. Additionally, controlling or restraining lengths of elongated articles is important for home and jobsite safety, as unbundled elongated articles can easily be a tripping hazard. Such elongated articles are herein referred to generally as "cords".

While existing cord organizers are numerous and have realized some success, unresolved problems remain. Many existing cord organizers are embodied in a rather large circular structure, either attached to a vertical surface or to a freestanding base, wherein the cord is wrapped in successive loops around the circular structure, either manually or by various powered mechanisms. While serviceable in some storage applications, this type of cord organizer is bulky, is not useable at many jobsite locations, and is often not close-at-hand when needed.

A more compact, convenient, and portable type of cord fastener has an elongated flexible body, which is fastenable to the end of a cord, having a portion of the elongated flexible body available for wrapping around the coils of the bundled cord and having a releasable securing mechanism for releasably securing the coils of the cord. Conventional cord fasteners of this type employ releasable securing mechanisms comprising notches or buttons with retainers or receivers or complementary hook and loop fasteners. While these securing mechanisms work as intended when new, in time the buttons and notches may deteriorate or wear down, impairing the ability of the retainers or receivers to efficiently engage them. Also, during use the complementary hook and loop fasteners become embedded with debris, thus lessening adhesion and reducing the useful lifetime of the fastener. Thus a need exists for a more durable, long-lasting securing mechanism.

Additionally, the distinct buttons and notches on the elongated flexible body require specialized tooling and, therefore, increase cost.

Further, at times two electrical cords must be joined together to be of adequate length to perform the job required. For example, a proximal electrical cord is attached to an electrical outlet via a male plug while its opposing female plug is connected to the male plug of a distal electrical cord, with the opposing female plug of the distal electrical cord attached to a piece of remote electrical equipment. In such a situation, any pulling or tugging on the distal electrical cord may dislodge the female-male connection between the two cords. The current invention advantageously can be additionally utilized to secure the female-male connection between two cords.

Accordingly, there is an established need for a durable, easy-to-use, easy-to-manufacture, and reusable cord-retaining fastener for bundled cords that is capable of easily attaching near a cord end in a convenient position to compactly secure coils of a bundled cord, when needed.

SUMMARY OF THE INVENTION

The present invention is directed to a handy, durable cord-retaining fastener that can be releasably affixed to an end of the cord so as to be always close-at-hand for using to releasably hold the coils of the cord when bundled. The cord-retaining fastener includes a flexible elongated webbed strap of sufficient length to extend around the bundled cord, a narrow elongated rectangular sleeve (for forming a fastener-attaching loop), and a buckle or other strap-end-retaining device.

The rectangular sleeve captively receives two portions of an intermediary segment of the elongated webbed strap to form a fastener-attaching loop, which is positioned around an end of the cord to releasably affix the cord-retaining fastener to the cord. Thus the cord-retaining fastener is conveniently positioned so the coils of the bundled cord can be compactly secured when required.

A buckle or other strap-end-retaining device is secured near a first end of the webbed strap and is configured to frictionally engage a second end of the webbed strap to form a cord-binding loop to encircle and hold the bundled cord.

The cord-retaining fastener is configured to be used with a wide variety of conventional elongated articles, such as, for example, cords, wires, electrical wires, hoses, cords, ropes, and cables.

An object of the present invention is to provide a cord-retaining fastener for bundled cords that can be adapted for use with a wide variety of cords, electrical wires, hoses, ropes, cables, or other elongated articles.

A further object of the present invention is to provide a cord-retaining fastener for bundled cords that is inexpensive to manufacture.

An additional object of the present invention is to provide a cord-retaining fastener for bundled cords that is durable.

Another object of the present invention is to provide a cord-retaining fastener for bundled cords that is configured to quickly attach near an end of a cord to remain available and accessible for use.

An additional object of the present invention is to provide a cord-retaining fastener for bundled cords that is configured to easily surround a variety of sizes and numbers of coils of a bundled cord.

Another object of the present invention is to provide a cord-retaining fastener for bundled cords that is configured to securely, compactly, and easily bind the coils of a bundled cord.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 4:
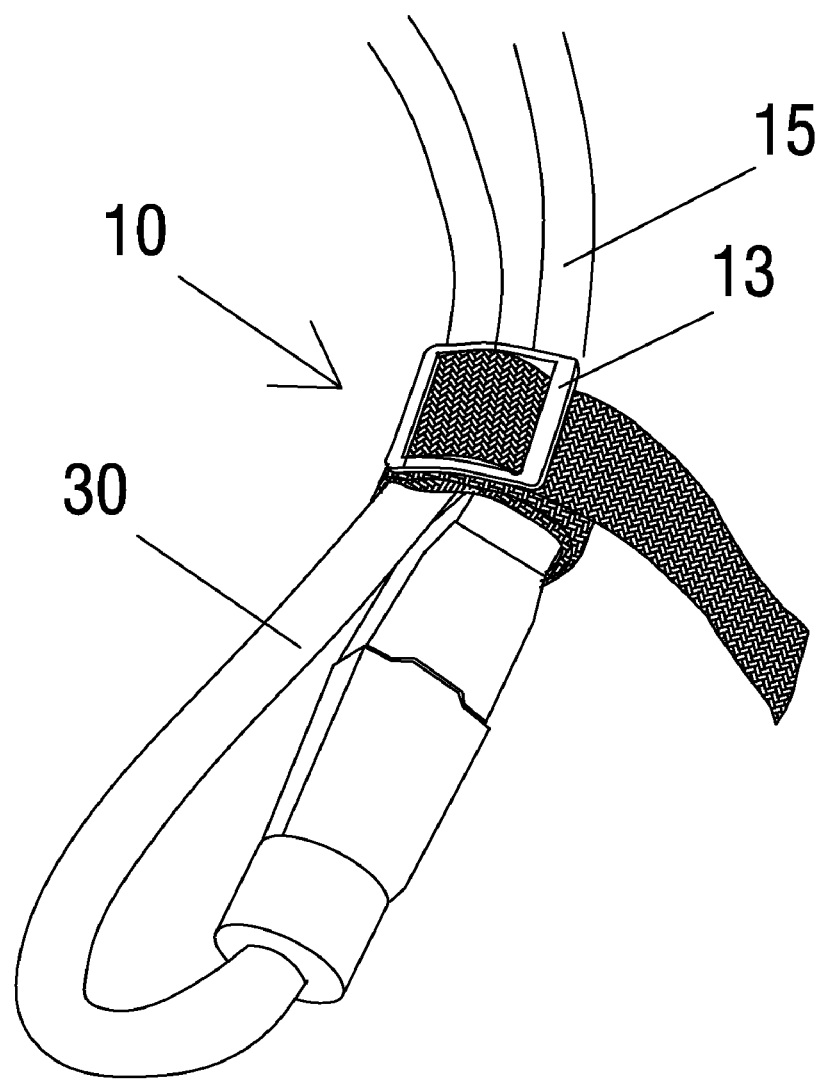
FIG. 4 is a perspective view showing a first embodiment of the cord-retaining fastener of the present invention being employed to releasably secure a cord connection.
Figure 5:
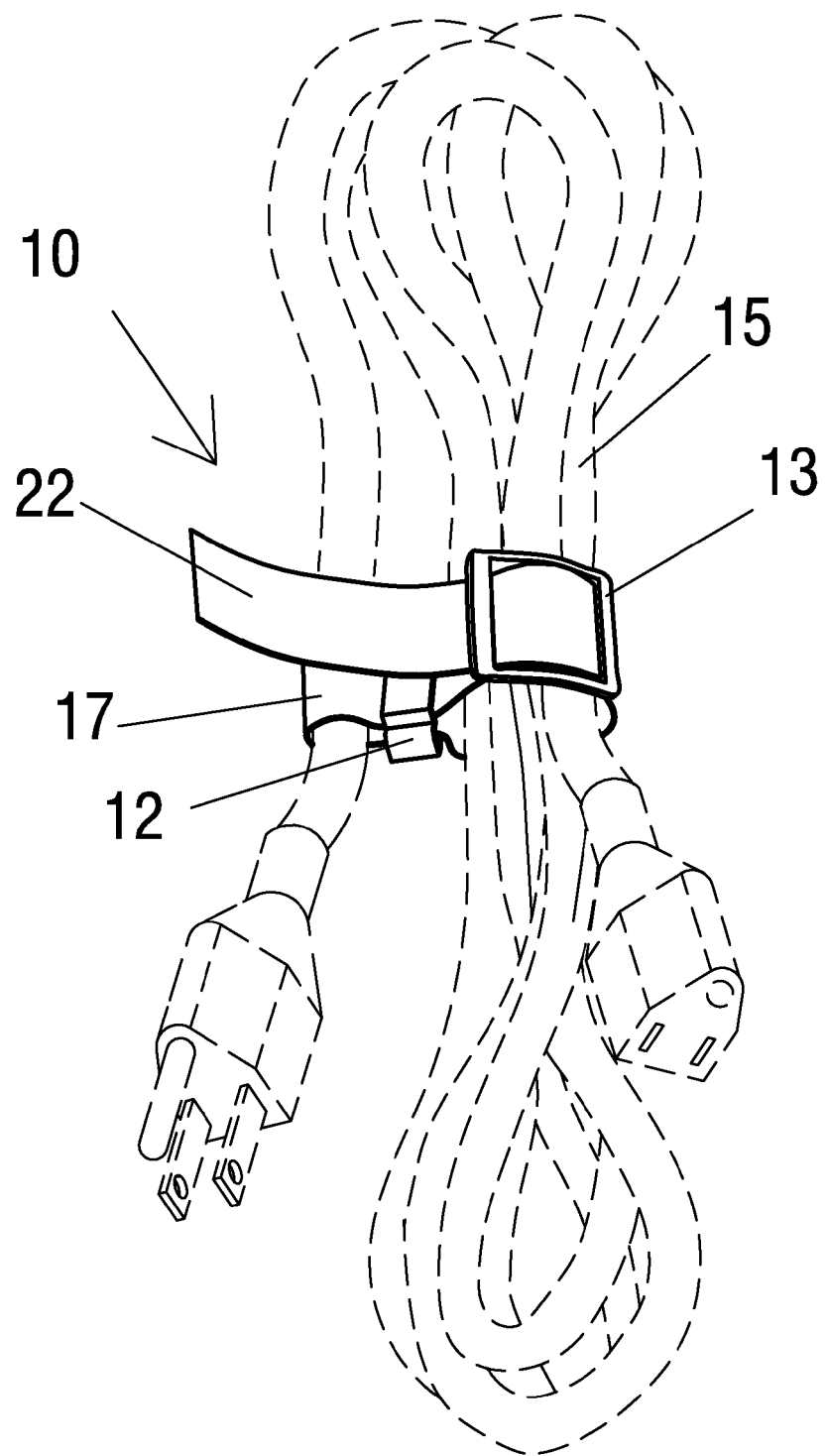
FIG. 5 is a perspective view showing a first embodiment of the cord-retaining fastener of the present invention being employed in a second type of cord bundling.

Shown throughout the figures, the present invention is directed toward a convenient, durable cord-retaining fastener for bundled cords that is easily attached near a cord end via a fastener-attaching loop where it remains in a convenient position to be releasably secured, when needed, around at least one additional section of cord and held by a strap-end-retaining device, such as a buckle, forming a cord-binding loop. The cord-binding loop may secure an additional section or sections of cord in numerous manners, such as, for example, a generally circular bundled cord (as in FIG. 1), a second cord (as in FIG. 4), or a compactly bundled cord (as in FIG. 5). The strap-end-retaining device may be a buckle, as in the first embodiment of FIG. 1 to FIG. 5, or another type of strap-end-retaining device, such as the two rings illustrated in the second embodiment of FIG. 6 or hook and loop Velcro®-type complementary fasteners (not shown).

The cord-retaining fastener for bundled cords 10 of the present invention is configured for use with a wide variety of cords, wires, hoses, electrical cords, ropes, cables, or other elongated articles, herein referred to generally as "cords".

Figure 1:
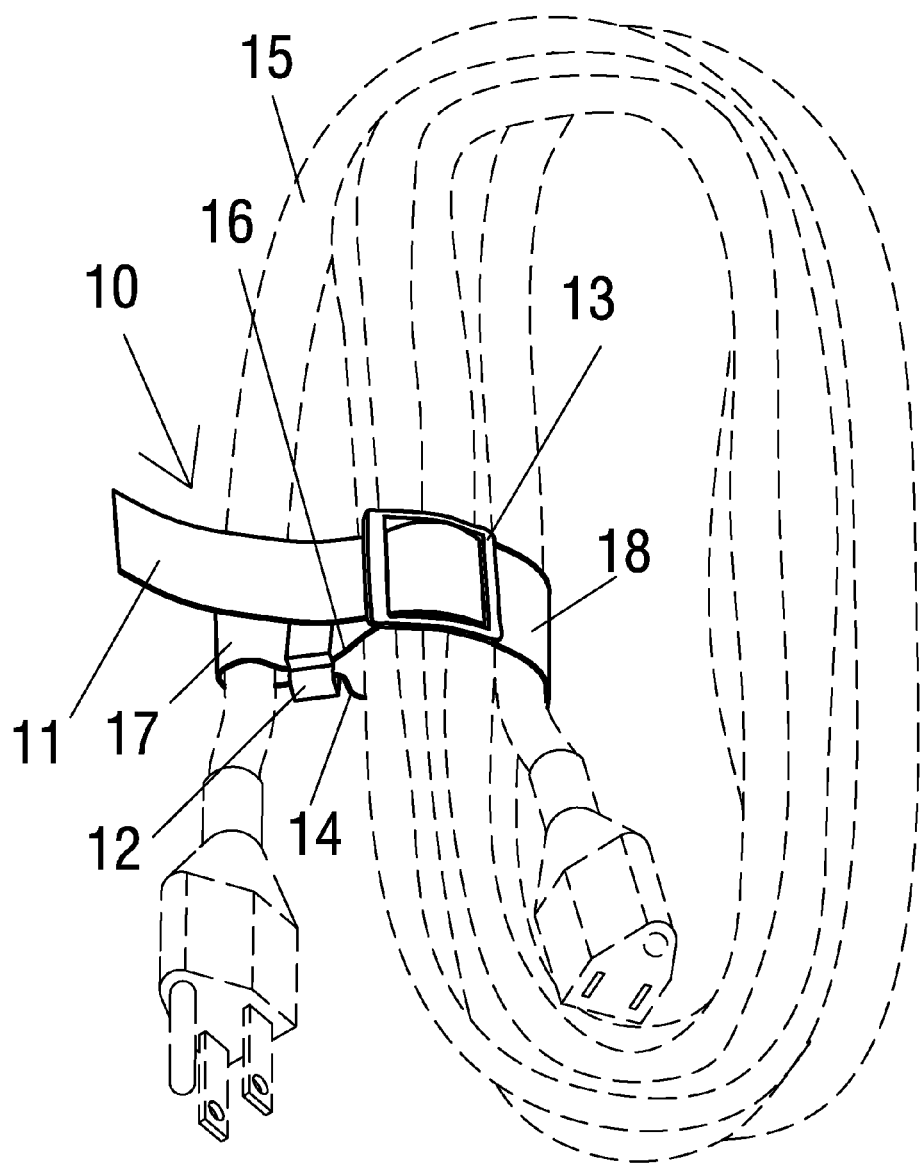
FIG. 1 is a perspective view showing a first embodiment of the cord-retaining fastener of the present invention being employed to releasably bundle an electrical cord.

Referring now to FIG. 1, a cord-retaining fastener for bundled cords, shown generally as reference number 10, is illustrated in accordance with a preferred embodiment of the present invention. As shown, the cord-retaining fastener for bundled cords 10 includes a flexible elongated strap 11, a narrow elongated rectangular sleeve 12, and a buckle 13. The cord-retaining fastener 10 comprises three loops, as follows: 1. a buckle-securing loop 24 (FIG. 2) for permanently retaining the buckle or other strap-end-retaining device on the strap 11; 2. a fastener-attaching loop 17 (FIG. 1) for removably fixing the cord-retaining fastener 10 to the cord 15 so as to be ready for use; and 3. a cord-binding loop 18 (FIG. 1) for releasably securing the cord 15, often in a bundled manner.

The flexible elongated strap 11 is of sufficient length to extend around the bundled cord 15 that is to be fastened together. Strap 11 has a first end 21 (FIG. 2) near buckle 13, intermediary portions 14, 16 (FIG. 1), and an opposing, extended second end 22 (FIG. 2) for wrapping around the bundled cord 15.

Strap 11 is formed of flexible strap material, preferably woven or braided webbing (FIG. 4), but the other flexible strap materials are within the scope of the invention. The flexible elongated strap 11 may be formed of one or more of the following materials: polypropylene, flat nylon, tubular nylon, natural cotton, dyed cotton, polyester, polypropylene, or other conventional webbing material. The length of flexible elongated strap 11 is sufficient to extend around the bundled cord 15, but may vary depending on the application. For example, when the cord-retaining fastener for bundled cords 10 of the present invention is designed to be utilized to retain a 100 foot electrical cord, the length of flexible elongated strap 11 will be longer than when the cord-retaining fastener for bundled cords 10 is designed to be utilized to retain a USB cord for a computer. Similarly, the width of flexible elongated strap 11 will vary depending on the type of cord it is designed to retain.

The rectangular sleeve 12 is preferably a narrow elongated rectangular base with an interior narrow elongated rectangular open slot having interior dimensions sufficient to accommodate two thicknesses of the flexible elongated strap 11. (Although a rectangular shape is preferred for sleeve 12, other somewhat elongated shapes, such as ovals, are within the scope of the invention.) Rectangular sleeve 12 is preferably formed of a plastic or similar polymer. The rectangular sleeve 12 captively receives two portions 14, 16 of an intermediary segment of the flexible elongated strap 11 to form a fastener-attaching loop 17, which is positioned around an end of the cord 15 to affix the cord-retaining fastener 10 to the cord 15. Thus the cord-retaining fastener 10 conveniently remains attached near the end of the cord 15 via the fastener-attaching loop 17, ready to buckle around the coils of the cord 15 when it is bundled.

Figure 2:
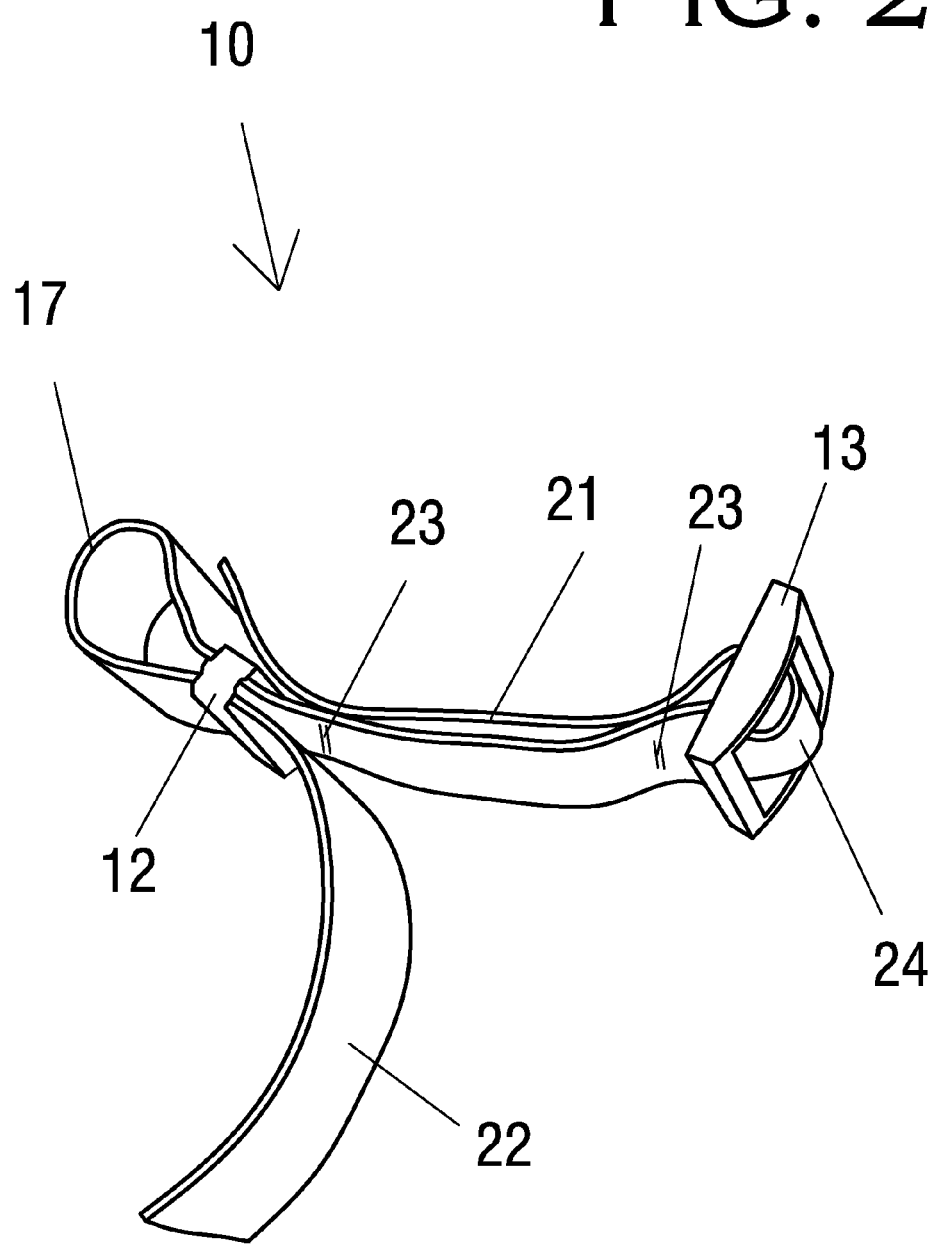
FIG. 2 is a perspective view showing a first embodiment of the cord-retaining fastener of the present invention.
Figure 3:
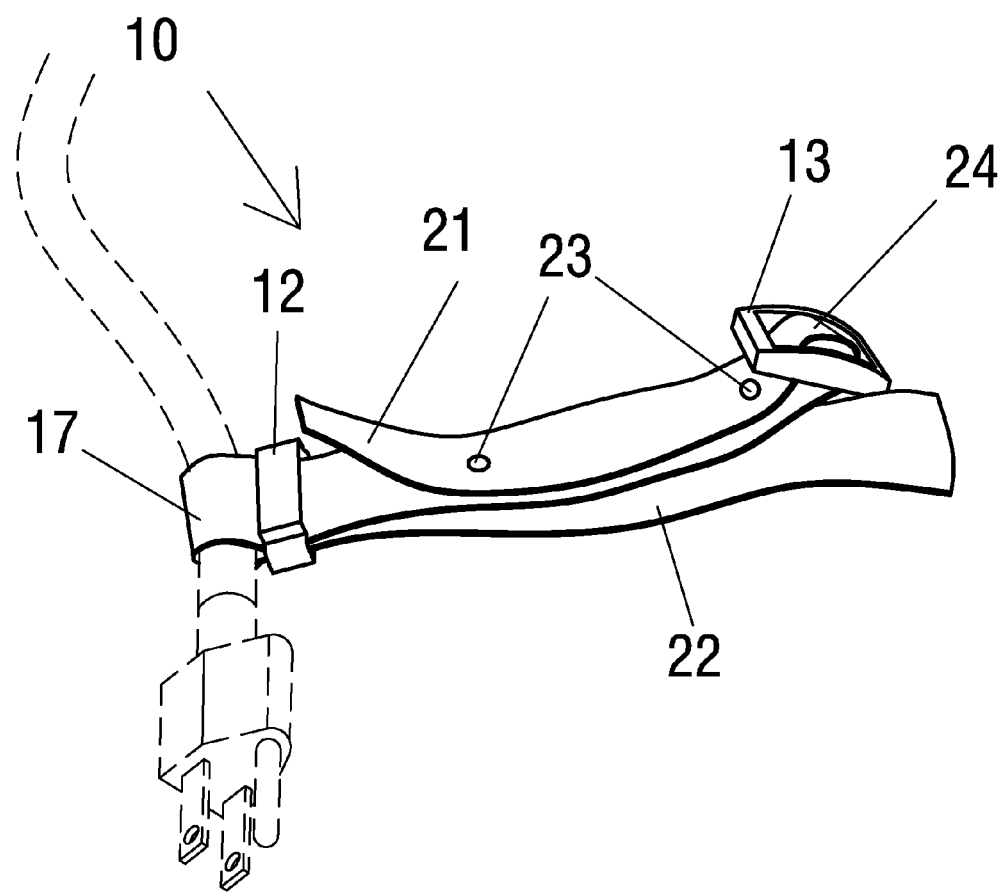
FIG. 3 is a perspective view showing a first embodiment of the cord-retaining fastener of the present invention as releasably attached to a cord by a fastener-attaching loop.

The buckle 13 preferably comprises a standard, conventionally available, frictional buckle, preferably formed of plastic or other polymer. The buckle 13 is preferably disposed near a first end 21 (FIG. 2) of the flexible elongated strap 11 via a buckle-securing system 23 (FIG. 2). The buckle-securing system 23 permanently constrains the buckle 13 to the area near the first end 21 in a buckle-securing loop 24.

The buckle-securing system 23 may utilize one or more of any of a number of permanent securing systems that secure two portions of the flexible elongated strap 11 in the appropriate configuration to form the buckle-securing loop 24, such as, for example, sewing (FIG. 2), rivets (FIG. 3), adhesives, posts with screws, or other permanent fastening mechanism. Sewing with a suitably durable and sturdy thread is preferred, as illustrated in FIG. 2.

The buckle 13, constrained in the buckle-securing loop 24 near the first end 21 of the flexible elongated strap 11, is used to frictionally engage the second end 22 (FIG. 2) of the flexible elongated strap 11, to form a cord-binding loop 18 (FIG. 1) to encircle and hold the bundled cord 15.

To use the cord-retaining fastener for bundled cords 10 of the present invention, the fastener-attaching loop 17 formed by the rectangular sleeve 12 is slipped over an end of a cord 15. The fastener-attaching loop 17 is then preferably tightened onto the end of cord 15 by manually pulling on the two intermediary portions 14, 16 (FIG. 1) of the flexible elongated strap 11. The cord-retaining fastener 10 then remains in this convenient position ready for use. When needed, the second end 22 (FIG. 2) of the flexible elongated strap 11 is brought around the one or more strands of cords to be retained and is brought to buckle 13 and threaded through buckle 13 to form the cord-binding loop 18 (FIG. 1). The cord-retaining fastener 10 held on cord 15 can surround and retain either a separate cord 30 (FIG. 4) to resist disconnection of a male-female cord connection or can surround and retain coils of the same cord 15 (FIG. 1, FIG. 5) to compactly and securely bind the coils in a variety of bundling situations.

Figure 6:
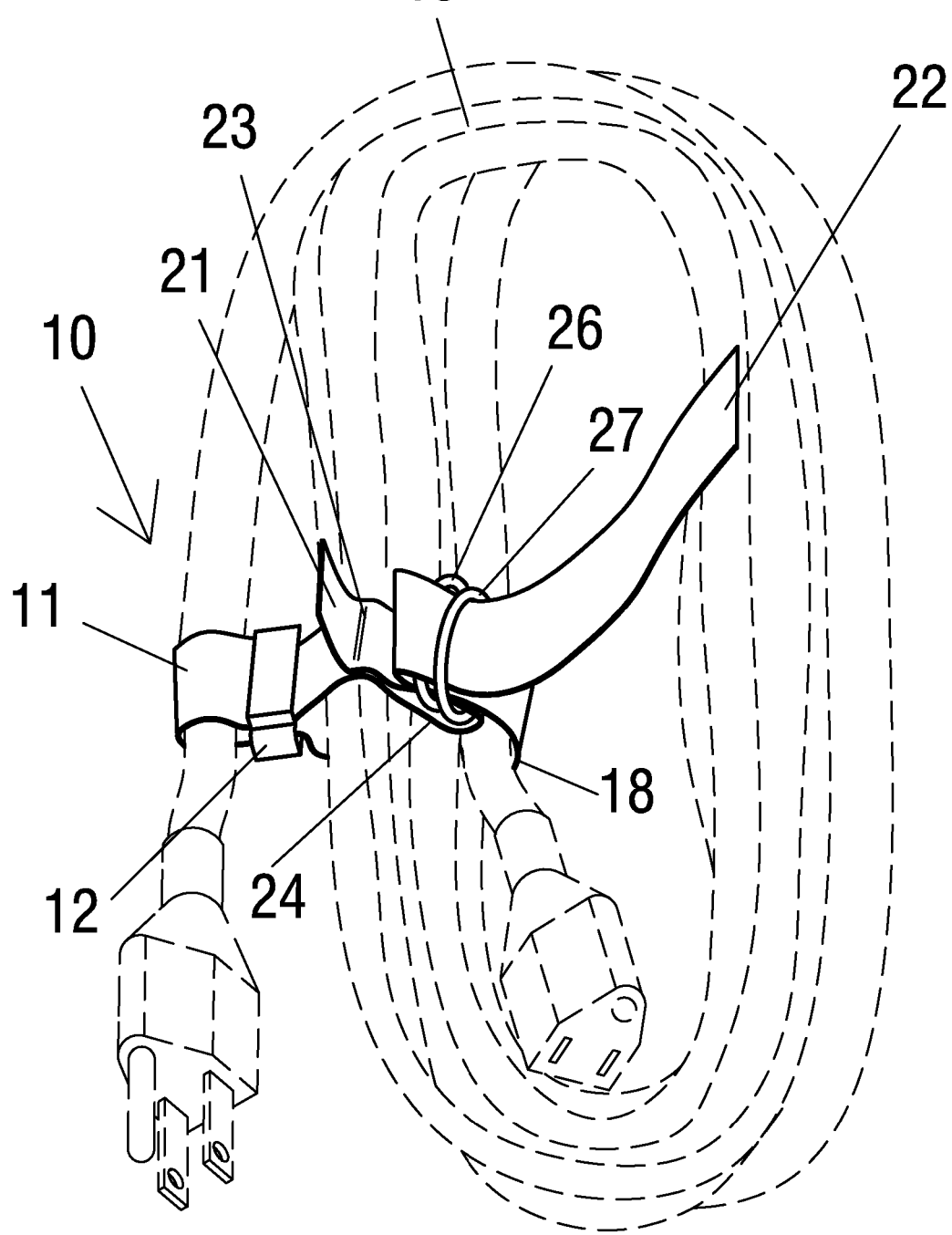
FIG. 6 is a perspective view showing a second preferred embodiment of the cord-retaining fastener of the present invention being employed to releasably bundle an electrical cord.

FIG. 6 illustrates a second exemplary embodiment of the cord-retaining fastener for bundled cords 10 of the present invention. The cord-retaining fastener for bundled cords 10 is structurally and functionally similar to the first exemplary embodiment of FIG. 1 to FIG. 5, however the second embodiment illustrates a second exemplary strap-end-retaining device, a double ring 26, 27. The double ring 26, 27 is constrained in the buckle-securing loop 24 near the first end 21 of the flexible elongated strap 11. Rings 26, 27 are formed of a material having sufficient strength to secure the second end 22, and preferably are formed of metal. To use the double ring 26, 27, the second end 22 of the flexible elongated strap 11 is threaded through both rings 26, 27, and then turned back over ring 26 and threaded through the ring 27. Thus, the double ring 26, 27 is functionally equivalent to the buckle 13 in securing the second end 22 to form a cord-binding loop 18 (FIG. 1) to encircle and hold the bundled cord 15.

Other strap-end-retaining devices are also within the scope of the invention, such as, for example, complementary hook and loop fasteners, such as Velcro® brand hook and loop fasteners.

From the foregoing, it will be apparent that the cord-retaining fastener for bundled cords 10 of the current invention provides a fastener for elongated articles that is adaptable for use with any of a number of cords, electrical wires, hoses, ropes, cables, or other long, slender articles. The use of a buckle or double rings instead of a button or notch increases the durability of the cord-retaining fastener 10 of the present invention. The cord-retaining fastener for bundled cords 10 of the present invention utilizes conventionally available parts, therefore manufacturing costs are minimized.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A method of bundling a cord, comprising:
    obtaining a cord-retaining fastener comprising a strap-end-retaining device, a sleeve, buckle-securing system, and a flexible elongated strap, wherein said strap has a strap first end, a strap intermediary segment, and a strap second end;
    obtaining said cord;
    forming a fastener-attaching loop by inserting two portions of said strap intermediary segments into said sleeve;
    inserting an end portion of said cord into said fastener-attaching loop, wherein said fastener-attaching loop is configured to hold said cord-retaining fastener in position for use;
    assembling said cord into a bundle;
    wrapping said strap intermediary segment around at least a portion of said bundle;
    feeding said strap second end into said strap-end-retaining device; and
    tightening said strap second end within said strap-end-retaining device.

2. The method of bundling a cord, as recited in claim 1, wherein said strap-end-retaining device is secured onto said strap via a buckle-securing system.

3. The method of bundling a cord, as recited in claim 2, wherein said strap-end-retaining device comprises a buckle.

4. The method of bundling a cord, as recited in claim 2, wherein said strap-end-retaining device comprises a two rings.

5. The method of bundling a cord, as recited in claim 2, wherein said buckle-securing system comprises a sewn fastening formed by stitching.

6. The method of bundling a cord, as recited in claim 2, wherein said buckle-securing system comprises rivets.

7. A method to secure a connection between a first cord and a second cord, comprising:
    obtaining a cord-retaining fastener comprising a strap-end-retaining device, a sleeve, buckle-securing system, and a flexible elongated strap, wherein said strap has a strap first end, a strap intermediary segment, and a strap second end;
    obtaining said first cord configured with first male and female ends;
    obtaining said second cord configured with second male and female ends;
    forming a fastener-attaching loop by inserting two portions of said strap intermediary segments into said sleeve;
    inserting an end portion of said cord into said fastener-attaching loop, wherein said fastener-attaching loop is configured to hold said cord-retaining fastener in position for use;
    plugging the one of said first male and female ends nearer said fastener-attaching loop into a complementary one of said second male and female ends;
    wrapping said strap intermediary segment around a segment of said second cord near said complementary one of said second male and female ends;
    feeding said strap second end into said strap-end-retaining device; and
    tightening said strap second end within said strap-end-retaining device.

8. The method to secure a connection between a first cord and a second cord, as recited in claim 7, wherein said strap-end-retaining device is secured onto said strap via a buckle-securing system.

9. The method to secure a connection between a first cord and a second cord, as recited in claim 8, wherein said strap-end-retaining device comprises a buckle.

10. The method to secure a connection between a first cord and a second cord, as recited in claim 8, wherein said strap-end-retaining device comprises a two rings.

11. The method to secure a connection between a first cord and a second cord, as recited in claim 8, wherein said buckle-securing system comprises a sewn fastening formed by stitching.

12. The method to secure a connection between a first cord and a second cord, as recited in claim 8, wherein said buckle-securing system comprises rivets.

* * * * *